W. J. McCRAY & B. A. HATCH.
WATER PURIFIER.
APPLICATION FILED SEPT. 3, 1913.
1,099,459.
Patented June 9, 1914.
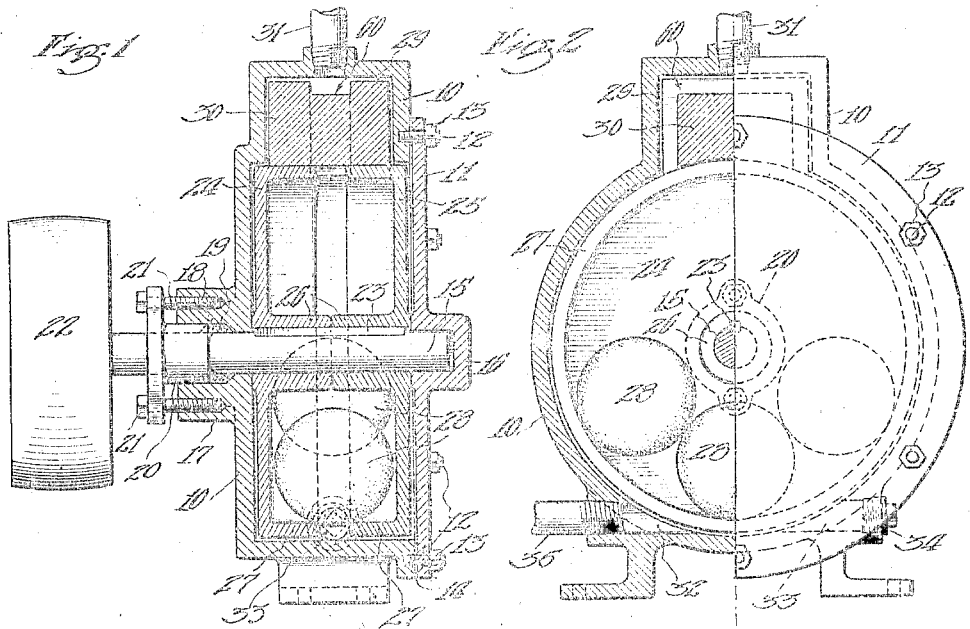
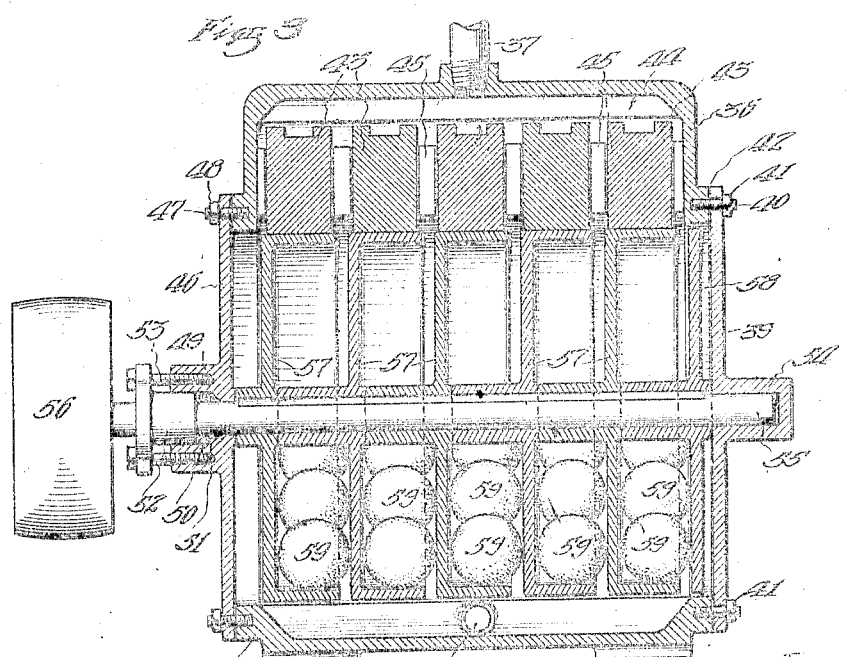

UNITED STATES PATENT OFFICE.

WILFORD J. McCRAY AND BERT A. HATCH, OF LOS ANGELES, CALIFORNIA.

WATER-PURIFIER.

1,099,459.  Specification of Letters Patent.  Patented June 9, 1914.

Application filed September 3, 1913. Serial No. 788,765.

*To all whom it may concern:*

Be it known that we, WILFORD J. McCRAY and BERT A. HATCH, both citizens of the United States, and residents of the city of Los Angeles, county of Los Angeles, and State of California, have invented a certain new and useful Improvement in Water-Purifiers, of which the following is a specification.
Our invention relates to water purifiers, and particularly to those used with steam boilers and the like.

The principal object of our invention is to produce an apparatus of the class described which may be placed in the feed water pipe of a steam boiler, or similar device, and which will continuously treat the entering water to prevent scale formation in the boiler.
A further object is to produce an apparatus of the class described which will be comparatively cheap to make and which will treat the water continuously for long periods without attention.
These objects are accomplished by supplying large masses of material of a composition suited to correct the impurities, and by causing a continuous abrasion of these masses so that fresh surfaces are continuously presented to the water.

Further advantages and objects will be disclosed in the drawings and specifications.

Referring to the drawings which are for illustrative purposes only; Figure 1 is a side elevation partly in section of one form of our invention. Fig. 2 is an end elevation partly in section of the same form of our invention; and Fig. 3 is a side elevation partly in section of an alternative form of our invention.

In the form shown in Figs. 1 and 2, 10 is a casing member provided with a cover 11 which is secured to the casing 10 by means of the studs 12 and nuts 13. Packing 14 is provided between the cover 11 and the casing 10. A shaft 15 is mounted in a bearing 16 formed on the cover 11 and in a bearing 17 formed on the casing 10, the bearing 17 having a recess 18 therein which is filled with packing 19, this packing being pressed into place by means of a follower 20 secured by the bolts 21 to the casing member 11. The shaft 15 projects through the stuffing box formed by the cavity 18, the packing 19 and the follower 20 and carries at its outer end a pulley 22 which is keyed or otherwise suitably secured to the shaft 15. The shaft 15 has a key 23 intermediate of its length upon which are mounted the drums 24 and 25, these drums having hubs 26 and flanges 27, the hubs 26 being of the proper length to hold the flanges 27 a short distance apart for purposes which will hereinafter be explained. Mounted inside of the drums 24 and 25 are balls 28 and mounted in a recess 29 above the drums 24 and 25 is a brake 30 which is loosely secured in the recess 29 and bears upon the outer surface of the flanges 27.

The method of assembling our invention is as follows: The brake 30 is placed in the recess 29, and the shaft 15 is slid into place. The drum 24 is pressed into position and the balls 28 are placed therein, the drum 25 is then pressed into position and the cover 11 is secured to the casing 10, the packing 14 being in place. The upper part of the cavity 29 is provided with a supply pipe 31 and the lower end of the casing is provided with two openings 32 and 33 which may be threaded for the reception of a pipe plug 34 or an outlet pipe 35.

In the form of our invention illustrated in Fig. 3, 36 is a casing provided with an inlet pipe 37 at the upper end thereof and an outlet pipe 38 at the lower end thereof. A cover 39 is provided secured to the casing 36 by means of studs 40 and nuts 41, packing 42 being provided between the casing 36 and the cover 39. A series of brakes 43 are mounted in a cavity 44 in the upper part of the casing 36, shallow ribs 45 being provided between the brakes 43 for the purpose of guiding the same. A cover 46 secured by the studs 47 and nuts 48 is located on the opposite end of the casing from the cover 39 and a bearing 49 is formed therein. This bearing is provided with a recess 50 in which is placed a packing 51 which is compressed by a follower 52 secured by bolts 53. The cover 39 is provided with a bearing 54 and a shaft 55 turns freely therein, passing through the casing 36 and outwardly through the bearing 49 and the stuffing box formed by the recess 50, the packing 51 and the follower 52. A pulley 56 is provided, rigidly secured on the outer end of the shaft 55. Mounted on this shaft there are a series of drums 57 and a drum cover 58, the members 57 and 58 being securely keyed to the shaft. A series of balls 59 is mounted in each of the drums 57 and the brakes 43 press upon the upper flanges thereof.

The method of assembling the form shown in Fig. 3 is exactly similar to that already explained in the case of the form shown in Figs. 1 and 2.

The method of operation of the form of our invention shown in Figs. 1 and 2 is as follows: The water to be purified is admitted to the cavity 29 through the inlet pipe 31 and passes through grooves 60 in the brake 30 and downwardly therethrough to the space between the flanges 27. It then passes around the hubs 26 and downwardly past the balls 28 passing outwardly through the pipe 35 between the flanges 27. The pulley 22 is driven by a source of power not shown and the drums 24 and 25 are continuously rotated thereby. The balls 28 therefore move around in the drums 24 and 25 and particles are abraded therefrom. The constant movement of the balls tends to break off fine particles, not only from the balls 28 but from the drums 24 and 25.

In the form of our invention shown in Fig. 3, water is admitted through the pipe 37 into the cavity 44 and passes downwardly between the brakes 43 into the space between the drums 57, passing downwardly across the balls 59 and outwardly through the pipe 38.

In practice we make the brakes 30 and 43 of an abrasive material, making the drums 24, 25 and 57 of a purifying material such as graphitic cast iron with or without other metals mixed therein. The balls 28 and 59 may be made of an alloy of graphitic cast iron with other metals or part of them may be of this material and part of an abrasive material. In practice we prefer to make them of pulverized graphite with or without other materials such as pulverized iron, aluminum and zinc, the materials all being compactly bound together by a binder such as sulfur or the like. The constant motion of the working parts causes a continuous abrasion of purifying material which is thereby released in small particles in the boiler feed water.

What we claim is:

1. A water purifier comprising a casing, inlet and outlet means for said casing, balls inside said casing of a material suited to correct the impurities of the water, and power driven means of a material suited to correct the impurities of the water for moving said balls abrasively in said casing.

2. A water purifier comprising a casing, inlet and outlet means for said casing, a drum of a material suited to correct the impurities of the water inside said casing, balls of a material suited to correct the impurities in the water inside said drum, and means for rotating said drum, thereby causing the balls to be abraded and to abrade said drum.

3. A water purifier comprising a casing, inlet and outlet means for said casing, a drum of a material suited to correct the impurities of the water inside said casing, balls of a material suited to correct the impurities in the water, so placed as to be abraded by said drum, and means for actuating said drum.

4. A water purifier comprising a casing, inlet and outlet means for said casing, a cover for said casing, a shaft supported by said casing and cover, two hollow drums mounted on said shaft, balls inside said drum, means for rotating said shaft and drums, and means for allowing the removal of said cover and a drum adjacent to said head to give access to said balls.

5. A water purifier comprising a casing, a power-driven member moving in said casing, said member being of a material suited to correct the impurities in the water, members of a material suited to correct the impurities in the water so placed as to abrade and be abraded by said power driven member, and inlet and outlet means for passing water through said casing.

6. A water purifier comprising a casing, inlet and outlet means for said casing, a cover for said casing, a shaft, a bearing in said cover for supporting said shaft, this bearing being closed at its outer end, a bearing in said casing for supporting said shaft, a stuffing box around said shaft and outside said bearing in the casing, abrasive bodies inside said casing actuated by said shaft, and means for rotating said shaft.

7. A water purifier comprising a casing, inlet and outlet means for said casing, a cover for said casing, a shaft supported by said casing and cover, two hollow drums of a material suited to correct the impurities in the water mounted on said shaft, balls of a material suited to correct the impurities in the water inside said drums, means for rotating said shaft and drums and means for allowing the removal of said cover, and a drum adjacent to said head to give access to said balls.

In testimony whereof, we have hereunto set our hands at Los Angeles, California, this 2nd day of September, 1913.

WILFORD J. McCRAY.
BERT A. HATCH.

In presence of—
P. H. SHELTON,
FRED A. MANSFIELD.